Aug. 30, 1932.  V. G. APPLE  1,875,206
INSULATION INCASED STATOR WITH GLASS LINING
Filed Nov. 28, 1930
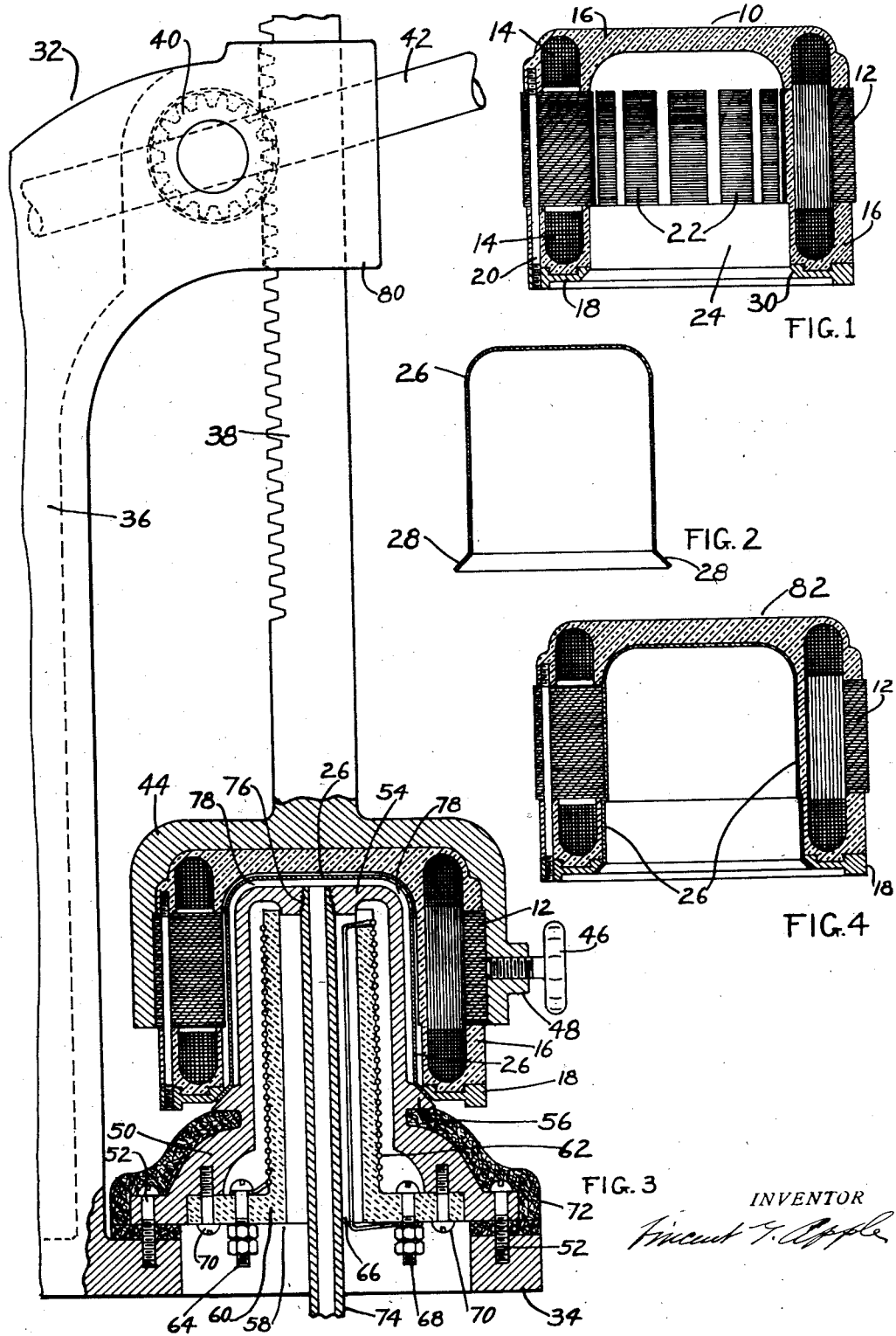
INVENTOR
Vincent G. Apple Patented Aug. 30, 1932

1,875,206

UNITED STATES PATENT OFFICE

VINCENT G. APPLE, OF DAYTON, OHIO

INSULATION INCASED STATOR WITH GLASS LINING

Application filed November 28, 1930. Serial No. 498,567.

This invention relates to stators for alternating current motors and particularly to stators having sealed-in windings.

An object of the invention is to provide a stator having its rotor chamber lined with a continuous wall of glass, thus adapting it to drive pumps for moving acids or acid gases.

Another object is to provide means and formulate a procedure for carrying the invention into effect.

I attain these and other objects in the structure, and by means of the tools and the procedure disclosed in the following specification and illustrated in the accompanying drawing, wherein—

Fig. 1 is an axial section through a stator having its windings incased in an armor of insulation.

Fig. 2 shows a glass cup from which I make a glass lining for my improved stator.

Fig. 3 shows the apparatus whereby the glass lining is being fastened into place in the stator.

Fig. 4 shows a completed stator with the glass lining secured in position.

Similar numerals refer to similar parts throughout the several views.

The stator 10, Fig. 1, which I have selected as a type to which my invention is particularly applicable, comprises a laminated core 12 having its winding 14 incased in a body 16 of insulation and a metal end plate 18 held to the end of the insulation body by the insulation itself and by the molded-in threaded studs 20.

The method of making the stator 10 preferably consists briefly in assembling the laminated core 12, putting on a winding 14 of wire having a fibrous covering which has been thoroughly impregnated and coated with liquid insulation, hardening the liquid insulation in the winding, placing the wound core together with the metal end plate 18 and studs 20 in suitably spaced apart positions in a mold and pressing a body 16 of plastic insulation consisting preferably of asbestos fibre and a suitable binder or of a similar heat resisting insulating compound between and around the spaced apart parts, then hardening the body of insulation. The inner surfaces 22 of the core teeth are not covered by the heat resisting insulating compound so that the glass lining, when afterward put in to the rotor chamber 24, will lie closely to the core teeth so that, by making the glass cup as thin as practicable, there will be no great non-magnetic gap between the ends of the teeth 22 and a rotor which will clear the chamber 24.

Fig. 2 shows the glass cup 26 before it is placed as a lining in the stator. Cup 26 has outside dimensions substantially the size and contour of the rotor chamber 24 of the stator, being just enough smaller to permit free entry of the cup into the rotor chamber. The lower open end is flared at 28 to correspond to the beveled inner diameter 30 of the end plate 18.

The apparatus for lining the rotor opening 24 with the cup 26 is shown in Fig. 3, and comprises a press 32 having a base 34, a frame 36, and a rack member 38 movable vertically in the frame by the pinion 40, and a rod 42 serving as a handle to rotate the pinion 40. The lower end of the rack member 38 carries the chuck 44. The chuck 44 is of such inside dimensions as will snugly fit the outside of the stator 10. A hand screw 46 extends through a hub 48 to hold stator 10 in place.

The heater body 50 is attached to the base 34 by the screws 52. The upper end 54 of the heater body 50 corresponds substantially in size and contour to the inside dimensions of the glass cup 26 being just enough smaller to fit the glass cup when the body is brought to a red heat. A beveled flange 56 fits closely up to the flared end 28 of the cup.

The inside of heater body 50 is hollowed out to contain the heating element 58 which comprises a spool 60 of lavite or similar heat resisting insulation with a coil 62 of resistance wire wound around it. The beginning of the coil 62 is attached to the terminal screw 64 and the end is brought down through the central opening 66 and attached to the terminal screw 68. The heating element is secured to the heater body by the screws 70. A covering 72 of heat insulating material surrounds the lower part of the heater body 50 to retain the heat.

A pipe 74 is brought up through the control opening 66 and threaded into the top of the heater body 50 at 76. Grooves 78 extend from the end of the pipe first radially in the top of the heater body then longitudinally down its sides. It is preferred that there be a plurality of these grooves emanating from the upper end of pipe 74 so that air under pressure may be brought up through the pipe and distributed evenly between the glass cup 26 and the upper end 54 of the heater body.

In practicing my invention I proceed as follows:—

Sufficient electric current is passed through the coil 62 to keep the heater body 50 at a red heat. The rack member 38 is raised by pinion 40 until the chuck 44 encounters the hub 80 of frame 36. A glass cup 26 is placed over the heater body 54 with the flared end 28 resting on the beveled flange 56. A stator 10 is placed in the chuck 44 and fastened with the hand screw 46.

When the stator 10 is placed in the chuck 44 it should be at as high a temperature as the insulation mass 16 will stand, and since the mass 16 ordinarily requires heating to cure it, this one heating operation may be made to serve the purpose of the steps herein recited by performing the present process immediately following the curing of the insulation mass 16. But the placing and curing of the insulation mass 16 forms no part of the present invention further than that the heat incident to the molding process may be utilized in carrying out the present invention.

When the glass cup 26 absorbs sufficient heat from heater body 50 to become plastic, the rack member 38 is quickly brought down by pinion 40 to the position shown in Fig. 3 where the flared end 28 of the glass cup is clamped between the flange 56 of the heater body and the beveled edge 30 of the stator end plate and at the same instant a valve, not shown, is opened to admit compressed air through pipe 74 which is distributed through grooves 78 over the inner surface of cup 26. The glass cup being in a plastic state expands until it fits the rotor chamber 24 of the stator tightly. When the plastic glass comes into contact with the inside of the stator its heat is almost instantly reduced to a degree substantially that of the stator, the stator being the larger mass. The stator is then quickly raised by means of the rack member 38 and removed from the chuck 44 and permitted to cool.

Since the stator core 12 and the glass lining 26 are both of substantially the same heat when removed from the apparatus, the glass lining will be further gripped by the stator in cooling, due to the fact that the material of the core 12 having a much higher coefficient of expansion will shrink a greater amount than the glass lining in cooling. A completed stator with its glass lining is shown at 82, Fig. 4.

From the description and drawing it is obvious that the stator 82 is particularly adapted to situations where the inside or rotor chamber must withstand acids or acid gases, as where it is used in connection with acid pumps, or in electrically driven refrigerating units of the kind wherein the interior of the motor is subject to the corrosive action of the refrigerant.

Having described my invention, I claim,

1. A dynamo electric machine stator having its rotor chamber lined with a continuous wall of glass.

2. A dynamo electric machine stator having a cup shaped glass lining within its rotor chamber.

3. A dynamo electric machine stator comprising a hollow body of insulation, a magnetizable core and a winding imbedded in said insulation, and a cup shaped glass lining completely covering the inner surface of the said hollow body.

4. A dynamo electric machine stator comprising a hollow body of molded insulation composed of asbestos fibre and a binder, an electromagnetic structure imbedded in said insulation, and a glass lining completely covering the inner surface of said hollow body.

In testimony whereof I affix my signature.

VINCENT G. APPLE.